(12) United States Patent
Nichols

(10) Patent No.: US 6,199,513 B1
(45) Date of Patent: Mar. 13, 2001

(54) CURRY COMB AND METHOD OF MANUFACTURE

(76) Inventor: James H. Nichols, 1783 Flat Gap Rd., Jefferson City, TN (US) 37760

( * ) Notice: Subject to any disclaimer, the term of this patent is extended or adjusted under 35 U.S.C. 154(b) by 0 days.

(21) Appl. No.: 09/627,686

(22) Filed: Jul. 28, 2000

(51) Int. Cl.[7] ................................................ A01K 13/00
(52) U.S. Cl. .......................................... 119/625; 119/633
(58) Field of Search ...................... 119/600, 617, 119/625, 628, 632, 633; 132/126, 142; D30/159

(56) References Cited

U.S. PATENT DOCUMENTS

| | | | | |
|---|---|---|---|---|
| 174,709 | * | 3/1876 | Sweet | 119/633 |
| D. 266,112 | | 9/1982 | Culp | D30/159 |
| D. 363,364 | | 10/1995 | Newman | D30/159 |
| D. 422,760 | | 4/2000 | Ticehurst | D30/159 |
| 670,894 | * | 3/1901 | Emery | 119/625 |
| 1,671,334 | * | 5/1928 | White | 132/142 |
| 2,962,997 | * | 11/1960 | Oliver | 119/632 |
| 3,491,725 | | 1/1970 | Maniscalco | 119/625 |
| 4,461,140 | | 7/1984 | Carmi et al. | 56/50 |
| 6,082,307 | * | 7/2000 | Landreneau | 119/625 |

* cited by examiner

Primary Examiner—Charles T. Jordan
Assistant Examiner—Elizabeth Shaw
(74) Attorney, Agent, or Firm—Pitts & Brittian P.C.

(57) ABSTRACT

A curry comb comprises an elongated handle, a plurality of curved blade and a hardened resin. The handle is preferably formed from a single piece and includes a first end and a second end, defining a longitudinal axis. A plurality of ridges and grooves are defined in the handle adjacent to the first end. A plurality of slots defined in the second end of the handle are generally parallel to one another and parallel to the longitudinal axis of the handle. A curved blade, having a secured end, a working end, an outer curved edge and an inner curved edge, extends into each of the slots and is secured in position with a hardened resin. The curved blades may be oriented in opposing directions and the inner curved edges of opposing blades may be sharpened to different degrees of sharpness.

11 Claims, 3 Drawing Sheets

CURRY COMB AND METHOD OF MANUFACTURE

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention relates generally to a curry comb and an improved method for manufacturing a curry comb and more particularly to a curry comb having blades adapted to comb and cut long hair without injuring an animal being combed.

BACKGROUND OF THE INVENTION

In the field of animal care, animals with long haired coats, including without limitation horses, llamas, camels and dogs, require combing and thinning to clear tangles, debris and insects that collect in the hair, thus preventing the hair from matting. Regular currying provides a healthier environment for the animals, as well as a more pleasant appearance.

Prior curry combs have generally oriented the teeth of the comb at an angle generally perpendicular to the length of an elongated handle. As a result of this orientation, the points of the comb teeth will poke and potentially scratch the skin of the animal being combed. Prior efforts to overcome the damage to an animal's skin have included the curvature of the teeth as shown in U. S. Pat. No. 3,491,725 issued to Maniscalco on Jan. 27, 1970. However, the construction of the '725 device is such that only one type of comb is available to the groomer and with repeated use the blades and handle will loosen, thus reducing the efficiency and safety of the curry comb.

Prior curry combs have also used generally smooth handles that will tend to slip in the hand of the groomer, especially when the comb encounters a tough snarl of hair or if the groomer's hand is wet. Such slippage is unsatisfactory because of its inefficiency as well as the potential for injury to the animal or the groomer. Also, groomers often use gloves while grooming. A smooth handle is difficult to manipulate in heavily matted hair, especially when gloves are used and when water is involved, as after an animal is bathed. It has also been found that curry combs assembled with threaded bolts, for example are prone to loosening over time, particularly as they are frequently tugged through matted and tangled hair.

In many cases, it is desirable to use a curry comb that does not have blades sharp enough to easily cut the hair. Instead the desire is to have the blades work their way through the tangled hair, removing any debris or insects and leaving the hair in a generally parallel orientation. However, there are times when it is desirable to thin the hair or to cut out hair that has become so hopelessly tangled that a comb cannot reorient the hair. For this situation, it is desirable to have blades that are sharp enough to cut the hair with force that will not be a discomfort to the animal. Heretofor two separate curry combs have been required two in order to provide both the combing function and the cutting function.

Accordingly, it is an object of the present invention to provide a curry comb that is adaptable to both comb and cut the long hair of animals. It is also an object to provide a curry comb that resists slippage in the hand of a groomer, even when the groomer's hand is wet or gloved. It is a further object to provide a method of manufacturing a curry comb with aligned blades that w ill not loosen with use. These and other advantages will become apparent to one skilled in the art when the following description is considered along with the drawings.

SUMMARY OF THE INVENTION

In accordance with the present invention, a curry comb is assembled from an elongated handle, a plurality of curved blades and a resin. The handle, preferably formed in a single piece, includes a first end and a second end and defines a longitudinal axis. A plurality of coaxial ridges and grooves are defined in the handle adjacent to the first end. A plurality of slots defined in the second end of the handle are generally parallel to one another and parallel to the longitudinal axis of the handle. A curved blade, having a secured end, a working end, an outer curved edge and an inner curved edge, extends into each of the slots and is secured in position with a hardened resin. The curved blades may be oriented in opposing directions and the inner curved edges of opposing blades may be sharpened to different degrees of sharpness.

A curry comb in accordance with the present invention may be assembled by forming an elongated handle having a first end, a second end and defining a longitudinal axis. A plurality of coaxial ridges and grooves are defined in the handle adjacent to the first end of the handle. A plurality of slots are defined in the second end of the handle. The slots are generally parallel to one another and parallel to the longitudinal axis of the handle. Each of the slots is adapted to receive a curved blade having a secured end and a working end. A malleable resin is packed into the slots and a blade is inserted into the resin in each slot and secured in a fixed position. while the resin hardens to permanently secure the blades in the slots.

DETAILED DESCRIPTION OF THE INVENTION

Figure 1:
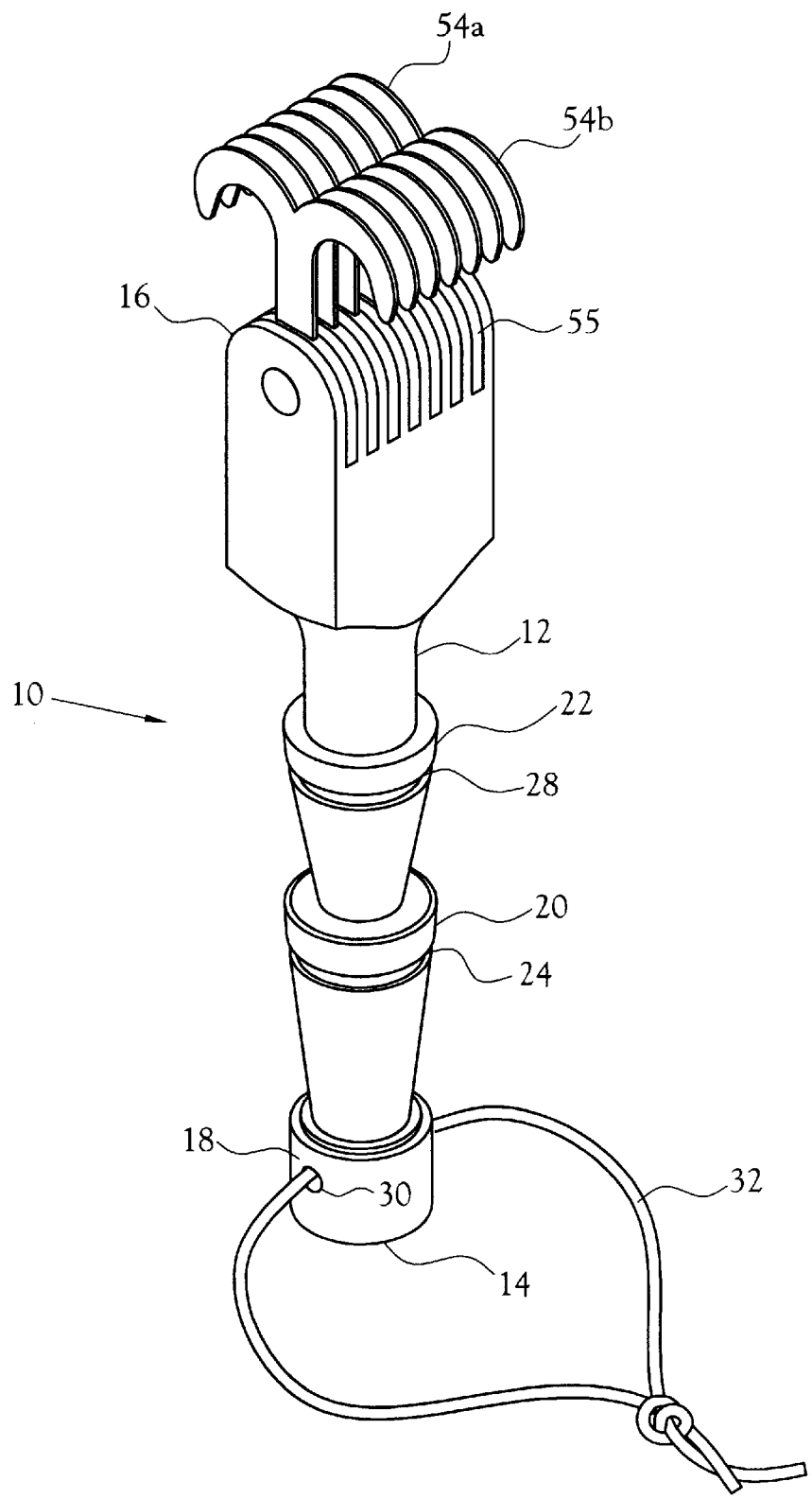
FIG. 1 is a perspective view of a curry comb in accordance with the present invention.
Figure 2:
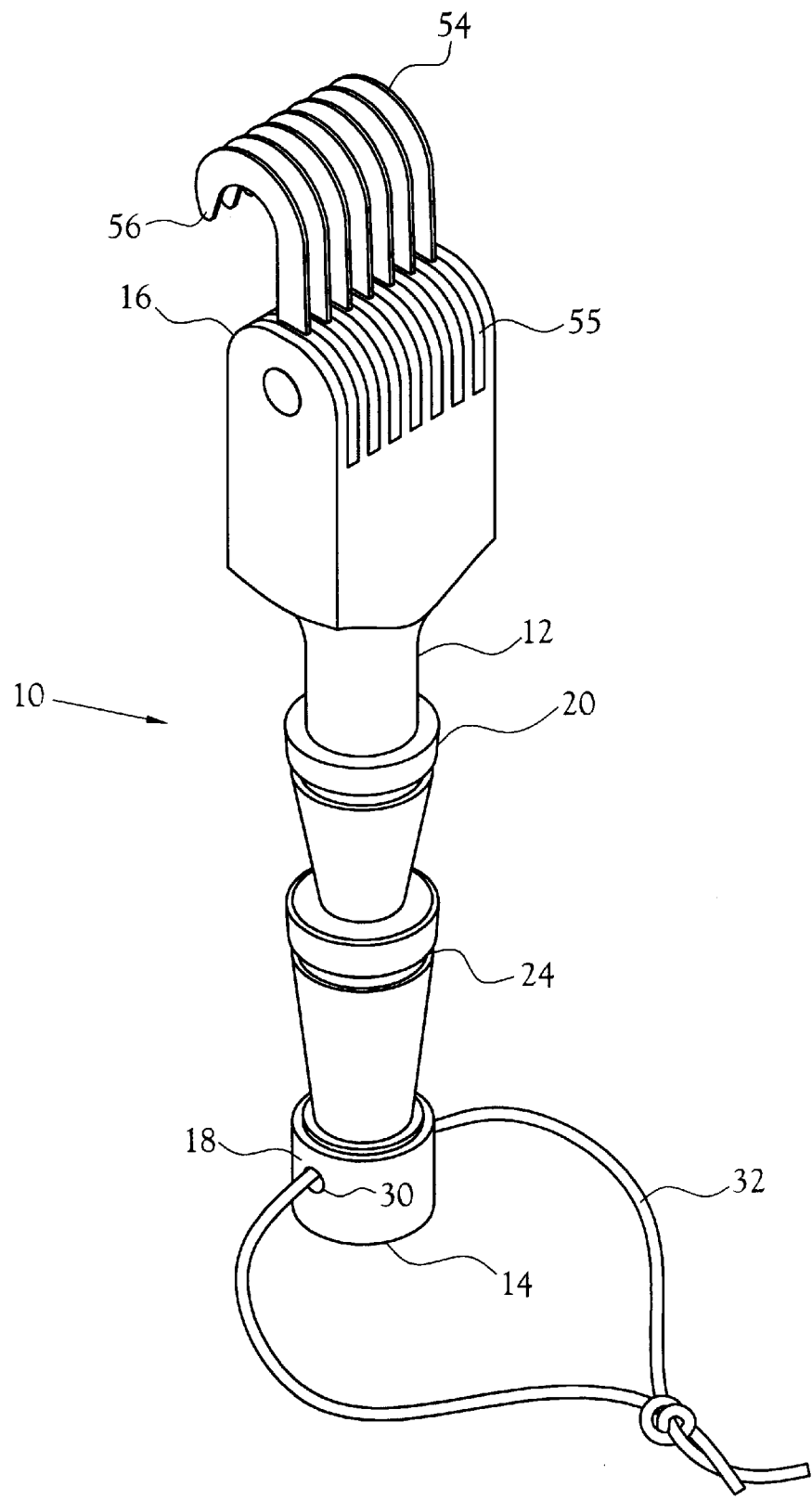
FIG. 2 is a perspective view of a curry comb in accordance with the present invention.

Referring now to the drawings, in which like reference numerals indicate like or corresponding features, there is shown in FIG. 1 a tool 10 embodying various features of the present invention. An elongated handle 12 having a first end 14 and a second end 16 defines a longitudinal axis. The handle 12 is about 8 inches in length in the depicted embodiment. Those skilled in the art will recognize that the handle may be fashioned from any of a variety of rigid materials including wood, metal or plastic. In the preferred embodiment hickory wood is used for its pleasing appearance and long-term durability. White oak is also acceptable. In the half of the handle adjacent to the first end 14, a plurality of coaxial, circumferential shoulders 18, 20 and 22 and grooves 24 and 28 are alternatingly defined in the handle 12. Between the shoulders and grooves, the handle is preferably tapered in diameter to increase the texture of the handle 12.

A loop bore 30 transverse to the longitudinal axis of the handle 12 is defined in the shoulder 18 adjacent to the first end 14. A flexible, elongated loop 32 comprising rawhide or cord, for example, extends through the bore 30 and is tied or otherwise sealed closed to provide a hanging mechanism for storage of the tool 10.

A plurality of slots 34 are defined in the second end 16 of the handle 12. Each of the slots 34 is about 1/16 inch wide and they are spaced apart by about 1/4 inch on centers. The slots 34 are oriented parallel to one another and parallel to the longitudinal axis of the handle 12. A bore 36 transverse to the longitudinal axis of the handle 12 is defined in the handle adjacent to the second end 16. The bore 36 extends perpendicularly through the slots 34. The bore 36 is countersunk to define an enlarged bore section 38 adjacent to the side wall 40. The enlarged bore section 38 is adapted to receive a head 42 of a pin 44, for example a nail, having a shaft 46 and a point 48. The bore 36 is adapted to receive the shaft 46, but is too narrow to allow passage of the head 42 therethrough.

A J-shaped steel blade 50, having a linear secured end section 52 and a curved, sharpened end section 54 is inserted into each of the slots 34. The blades 50 are essentially identical. Accordingly, only one of the blades will be described in detail. Each blade 50 preferably comprises spring steel and forms a circular curve of about 180 degrees. The inner edge of the curved, sharpened end section, which is about 1/4 inch wide and 1/32 inch thick, is sharpened, preferably with a grinder to a desired sharpness determined by the intended use of the curry comb and the type of hair being combed. For example, a thinning comb intended to readily cut hair has a sharper blade than a comb intended primarily to separate tangled hair. The distal end 56 of the blade is blunted to prevent accidental injury to an animal.

An aperture 58 is defined in the secured end section 52 of each blade 50. The diameter of the aperture 58 is approximately equivalent to the diameter of the bore 36 and slightly greater than the diameter of the shaft 46 of the nail 44. The aperture 58 in each blade 50 is located so that it is coaxially aligned with the bore 36 when the secured end section is inserted into the slot 34.

As depicted in FIG. 1, each blade 50 may include two opposing curved end sections 54a and 54b. The sections 54a and 54b are oriented in opposite directions. The blade sections on opposing sides may be sharpened to different degrees so that the blades on one side of the curry comb may be sharp enough to cut and thereby thin an animal's hair while the blades on the opposing side may be less sharp to separate tangled hair. The opposing blades 54a and 54b may be formed from a single piece of metal or alternatively, two blades, each with a single curved end section 54, may be inserted into a single slot 36 with the curved end sections oriented in opposite directions.

The secured end sections 52 are secured in the slots with an epoxy resin 55 that is packed into the slots in a malleable form and then allowed to set to a hardened form. An epoxy resin that has been found to be suitable is sold by Brownells, Inc. under the name ACRAGLAS Gel. In this manner, the blades 50 are permanently secured within the slots 36.

Figure 3:
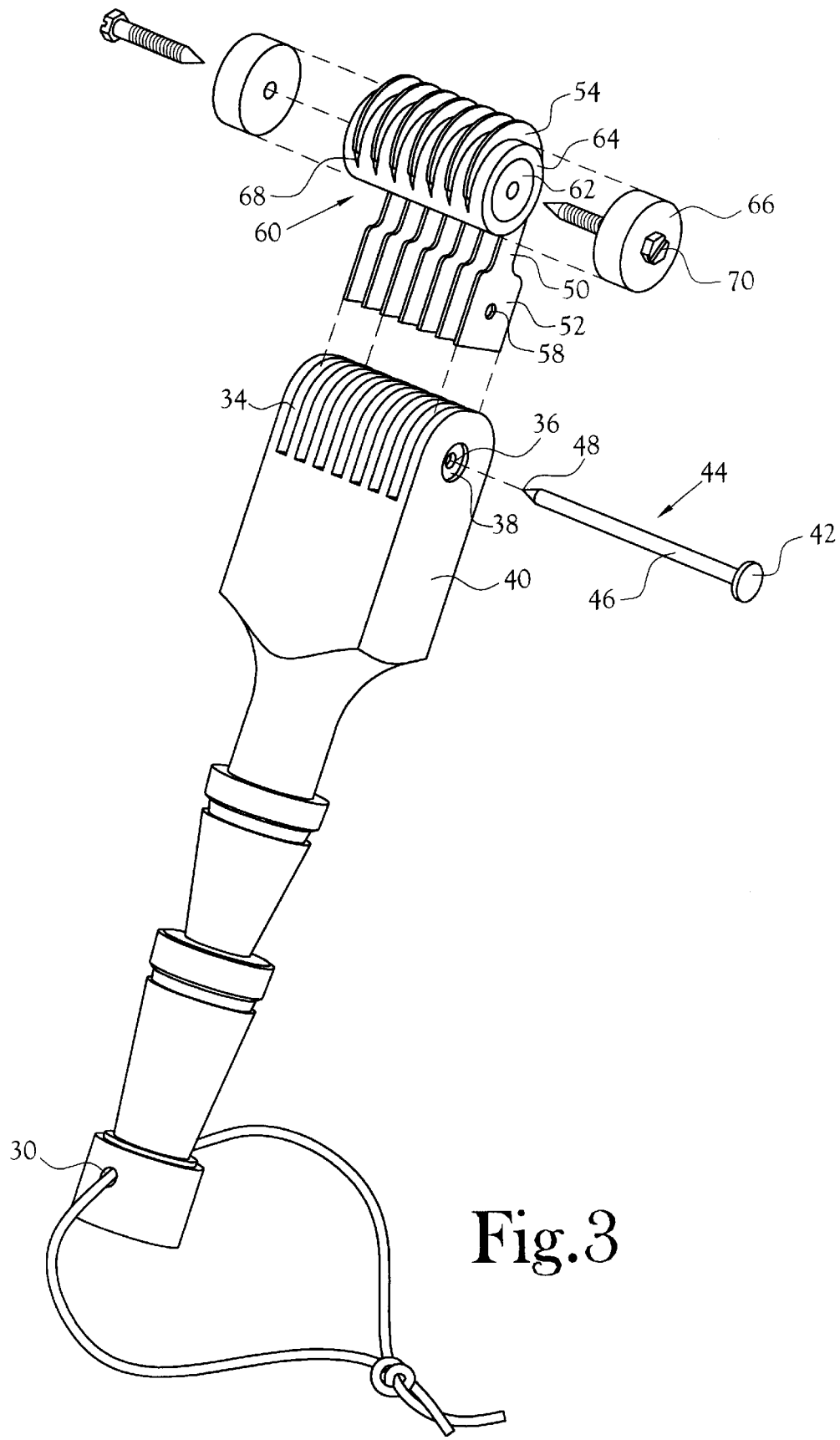
FIG. 3 is an exploded perspective view of a curry comb in the process of manufacture.

As depicted primarily in FIG. 3, a curry comb in accordance with the present invention may be assembled using a generally cylindrical jig 60. The jig 60 comprises a cylindrical core 62 having a length approximately equal to the length of the bore 36. The core 62 in the depicted embodiment comprises a wooden dowel approximately 5/8 inch in diameter and about 1 and 3/4 inches long. The core 62 is encased in a coaxial rubber tube 64 having an inner diameter of about 5/8 inch and an outer diameter of about 7/8 inch. The tube 64 is about 2 inches in length, thus extending about 1/8 inch beyond the core 62 at each end of the core 62. A cap 66 is adjustably secured to each end of the tube 64 with a threaded screw 70, for example. Alternatively, a threaded bolt may be used, extending longitudinally through the core 62 and both end caps 66. The diameter of each of the end caps 66 is approximately equal to the outer diameter of the tube 64.

A plurality of circumferential slits 68 are defined in the tube 64, each slit 64 extending approximately 300 degrees around the periphery of the tube. The slits 68 are spaced apart by a distance of approximately 1/4 inch, the desired spacing between the blades 50 of the curry comb 10.

To assemble a curry comb 10 in accordance with the present invention, the end caps 66 are loosened by unthreading the screws 70, thus relieving pressure on the tube 64 by the end caps 66. The sharpened end section 54 of each of a plurality of blades 50 is inserted into one of the slits 68 until the inner curved edge engages the core 62. The blades are aligned so that the apertures 58 of all of the blades are colinear. The end caps 66 are tightened into engagement with the tube 64 by threading the screws 70 into the core 62. The pressure of the end caps 66 against the tube 64 squeezes the sharpened end sections to hold the blades 50 in parallel, fixed positions relative to the jig 60.

While in a malleable form, the resin 55 is packed into the slots 34, essentially filling the slots 34 and the bore 36. The secured end sections 52 are then simultaneously inserted into the slots 34 defined in the elongated handle 12 until the apertures 58 are aligned with the bore 36. A nail 44 is inserted through the bore 36 and the apertures 58 until the head 42 is located within the enlarged section 38 of the bore 36. The curry comb 10 is then hung from its loop 32 while the adhesive is allowed to set to a hardened condition, permanently securing the blades 50 in the slots 34 in their correct positions. Thereafter, the point 48 of the nail 44 is cut off to provide a smooth handle surface. The screws 70 are loosened to relieve the pressure applied to the hose 64 and the jig 60 is removed from the blades 50. A polyurethane varnish is then applied to the handle to protect the wood from moisture and stains.

While a preferred embodiment has been shown and described, it will be understood that it is not intended to limit the disclosure, but rather is intended to cover all modifications and alternate methods and apparatus within the spirit and scope of the invention.

I claim:

1. A curry comb comprising an elongated handle having a longitudinal axis and a first end and a second end, a plurality of coaxial ridges and grooves defined at spaced intervals along said handle adjacent to said first end, a plurality of slots defined in said handle at said second end, said slots being generally parallel to one another and to said longitudinal axis, a plurality of curved blades, each of said blades having a secured end section, a sharpened end section, an inner edge and an outer edge, said secured end section being located within one of said slots and said sharpened end section extending longitudinally beyond said second end of said handle generally parallel to said longitudinal axis, and a hardened resin securing said blades within said slots.

2. A curry comb in accordance with claim 1 wherein said blades are J-shaped.

3. A curry comb in accordance with claim 1 wherein each of said blades includes a first curved section and a second curved section opposed to said first curved section.

4. A curry comb in accordance with claim 3 wherein said first curved section of each blade is sharper than said second curved section.

5. A curry comb in accordance with claim 1 wherein a bore is defined within said second end of said handle, said bore extending generally perpendicularly through said slots, each blade defines an aperture in the secured end of said blade, and an aligning shaft extends through said bore and each of said apertures in said blades.

6. A curry comb in accordance with claim 1 wherein a loop bore extends through said first end of said handle generally perpendicular to said longitudinal axis and a flexible closed loop extends through said loop bore.

7. A process of assembling a curry comb comprising:
   a. forming a handle, having a first end and a second end and defining a longitudinal axis, with a plurality of coaxial ridges and grooves defined at spaced intervals along said handle adjacent to said first end,
   b. defining a plurality of slots in said handle at said second end, said slots being generally parallel to one another and to said longitudinal axis,
   c. inserting a plurality of curved blades into said handle, each of said blades having a secured end, a working end, an inner edge and an outer edge, said secured end being located within one of said slots and said working end extending longitudinally beyond said second end of said handle generally parallel to said longitudinal axis,
   d. Securing said blades in a fixed position with a malleable resin packed into said slots to fill said slots, and
   e. curing said resin to a hardened state to permanently secure said blades within said slots.

8. A process in accordance with claim 7 and further comprising the steps of
   a. defining a bore within said second end of said handle, said bore extending generally perpendicularly through said slots,
   b. defining a hole in the secured end of each of said blades, and
   c. inserting an aligning pin through said bore and each of said holes in said blades after said malleable resin is packed into said slots.

9. A process in accordance with claim 8 wherein said blades are temporarily mounted upon a jig before said blades are inserted into said slots and while said resin hardens.

10. A process in accordance with claim 8 and including the step of defining a loop bore in said first end of said handle.

11. A process in accordance with claim 8 and including the step of orienting blades in a first direction and an opposing second direction and sharpening said blades oriented in said first direction to a greater degree than said blades oriented in said second direction.

* * * * *